(12) United States Patent
Kunisada et al.

(10) Patent No.: US 9,663,170 B2
(45) Date of Patent: May 30, 2017

(54) HARNESS SUPPORT STRUCTURE OF MOTORCYCLE

(71) Applicant: Kawasaki Jukogyo Kabushiki Kaisha, Kobe-shi, Hyogo (JP)

(72) Inventors: Youhei Kunisada, Kobe (JP); Satoshi Takaya, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/945,180

(22) Filed: Nov. 18, 2015

(65) Prior Publication Data

US 2016/0068215 A1 Mar. 10, 2016

Related U.S. Application Data

(63) Continuation of application No. PCT/JP2014/058696, filed on Mar. 26, 2014.

(30) Foreign Application Priority Data

May 24, 2013 (JP) ................................ 2013-109814

(51) Int. Cl.
*B62J 6/18* (2006.01)
*B62J 6/02* (2006.01)
(Continued)

(52) U.S. Cl.
CPC .............. *B62J 6/18* (2013.01); *B60Q 1/0094* (2013.01); *B62J 6/02* (2013.01); *B62J 2099/0046* (2013.01)

(58) Field of Classification Search
CPC ...................................... B62J 6/02; B62J 6/18
(Continued)

(56) References Cited

U.S. PATENT DOCUMENTS 6,135,625 A * 10/2000 Kodaira ..................... B62J 6/02
362/473
7,287,889 B2 * 10/2007 Yamamoto ........... B60Q 1/2696
362/545

(Continued)

FOREIGN PATENT DOCUMENTS

CN 102173303 9/2011
CN 202107046 1/2012
(Continued)

OTHER PUBLICATIONS

English Translation of the International Preliminary Report on Patentability and Written Opinion of the International Searching Authority mailed Dec. 3, 2015 for International PCT Patent Application No. PCT/JP2014/058696, filed Mar. 26, 2014 (12 pages).

(Continued)

*Primary Examiner* — Bradley Duckworth

(57) ABSTRACT

In a harness support structure for a motorcycle, a cable bracket is supported by a top bridge, and an upper lamp bracket for supporting a headlamp device is fitted to the cable bracket. A first holding portion for holding an intermediate portion of cable members having respective one end portion connected with a handle is provided in the cable bracket. The cable bracket is provided with a regulating portion for inhibiting a forward movement of the cable member at a location distant from a handle side rather than the first holding portion.

6 Claims, 7 Drawing Sheets

(51) Int. Cl.
B60Q 1/00 (2006.01)
B62J 99/00 (2009.01)

(58) Field of Classification Search
USPC .............................. 248/68.1; 362/475, 476
See application file for complete search history.

(56) References Cited

U.S. PATENT DOCUMENTS

| | | | |
|---|---|---|---|
| 8,430,544 B2* | 4/2013 | Tu .............................. | B62J 6/02 362/370 |
| 9,039,258 B2* | 5/2015 | Noguchi .................... | B62J 6/02 362/476 |
| 9,056,579 B2* | 6/2015 | Yun ....................... | B60Q 1/0047 |
| 2005/0174788 A1* | 8/2005 | Hood ......................... | B62J 6/02 362/475 |
| 2009/0237948 A1 | 9/2009 | Oshima et al. | |
| 2011/0273896 A1* | 11/2011 | Yun ..................... | B60Q 1/0047 362/476 |
| 2014/0003078 A1* | 1/2014 | Monma ..................... | B62J 6/02 362/516 |
| 2015/0029738 A1* | 1/2015 | Takenaka ................... | B62J 6/02 362/474 |
| 2015/0258929 A1* | 9/2015 | Kato .......................... | B62J 6/02 362/473 |
| 2015/0266410 A1* | 9/2015 | Takaya ...................... | B62J 6/02 362/476 |

FOREIGN PATENT DOCUMENTS

| | | |
|---|---|---|
| EP | 2933173 | 10/2015 |
| JP | 06-115473 | 4/1994 |
| JP | 11-198713 | 7/1999 |
| JP | 2006-224751 | 8/2006 |
| JP | 2009-040312 | 2/2009 |
| JP | 2009-161011 | 7/2009 |
| JP | 2013-052725 | 3/2013 |

OTHER PUBLICATIONS

English Translation of the International Preliminary Report on Patentability and Written Opinion of the International Searching Authority mailed Dec. 30, 2015 for International PCT Patent Application No. PCT/JP2014/058696, filed Mar. 26, 2014 (12 pages).
International Search Report for PCT/JP2014/058696, filed Mar. 26, 2014.
Notification of Reason(s) for Rejection Issued Nov. 15, 2016 for Corresponding Japanese Patent Application No. 2013-109814 and English Language Summary (5 pages).
Extended and Supplementary Search Report Issued Jan. 25, 2017 for Corresponding European Patent Application No. 14800893.1(9 pages).
Decision of Grant Issued Apr. 4, 2017 for Corresponding Japanese Patent Application No. 2013-109814 (3 pages).
First Office Action Issued Apr. 6, 2017 for Corresponding Chinese Patent Application No. 201480028821.4 with English Language Translation of the Search Report Attached to the Office Action (7 pages).

* cited by examiner

HARNESS SUPPORT STRUCTURE OF MOTORCYCLE

CROSS REFERENCE TO THE RELATED APPLICATION

This application is a continuation application, under 35 U.S.C §111(a) of international application No. PCT/JP2014/058696, filed Mar. 26, 2014, which claims priority to Japanese patent application No. 2013-109814, filed May 24, 2013, the entire disclosure of which is herein incorporated by reference as a part of this application.

BACKGROUND OF THE INVENTION (Field of the Invention)

The present invention relates to a harness support structure having one end supported by a handlebar of a motorcycle.

(Description of Related Art)

The handlebar of a motorcycle has mounted thereon various vehicle operating members such as, for example, switches, gauges, a clutch and an accelerator, and hydraulic tubes and electric cables associated with those vehicle operating members are fixed in position by, for example, attachments provided in a head pipe, and/or a top bridge or a bottom bridge supported by such head pipe at a front end of a vehicle frame structure. Also, instruments and equipment disposed forwardly of the vehicle body are supported by the top bridge, besides those attachments. In this connection, see, for example, the patent document 1 listed below. According to the patent document 1 referred to, as such instruments, reference is made to a combination switch having a cylinder lock.

Prior Art Literature

Patent Document 1: JP Laid-open Patent Publication No. 2006-224751

It has, however, been found that in the motorcycle disclosed in the patent document 1 referred to above, support of tubes and cables by the top bridge and attachment of the combination switch need be performed separately and, therefore, the assemblability is poor.

SUMMARY OF THE INVENTION

In view of the above, the present invention has been devised to substantially eliminate the problems and inconveniences discussed above and is intended to provide a harness support structure for a motorcycle, in which the assemblability can be improved, when support of hydraulic tubes and cables extended from the handlebar and attachment of instruments disposed forwardly of the vehicle are executed.

In order to accomplish the foregoing object of the present invention, a harness support structure for a motorcycle in accordance with the present invention includes: a cable bracket configured to fix a portion of cable members connected at one end with a handle and supported by a top bridge; and an instrument bracket configured to support an instrument disposed forwardly of a vehicle body and fitted to the cable bracket. The instrument referred to above is, for example, a headlamp. It is to be noted that the term "cable member" is intended to mean any tube of a hydraulic system and/or any cable of an electric system or a mechanical system.

According to the present invention, after the cable bracket has been fitted to the top bridge and the cable member has subsequently been fixed to the cable bracket, the instrument bracket, with which an instrument has been connected, can be fitted to the cable bracket. Accordingly, support of the cable member to the top bridge and fitting of the instrument can be eased and the assemblability is therefore increased.

In a preferred embodiment of the present invention, the cable bracket referred to above preferably includes: a holding portion configured to hold an intermediate portion of the cable member fixed to the cable bracket; and a regulating portion provided in at least one of the cable bracket and the instrument bracket and operable to inhibit a forward movement of the cable member at a position distant from a handle side than to the holding portion. According to the use of the regulating portion, the cable member can be held by the holding portion and, at the same time, an undesirable forward movement of the cable member can be suppressed by the regulating portion, and, therefore, the cable member can be compactly supported and guided.

Where the holding portion and the regulating portion are employed, the cable member is preferably passed through an opening, formed by the cable bracket and the instrument bracket and oriented in a vertical direction, in which case the instrument bracket forms the regulating portion. According to this structural feature, since the instrument bracket itself forms the regulating portion, the cable member can be effectively regulated with no extra regulating portion employed.

Where the holding portion is employed, the holding portion is preferably provided in one pair on left and right. According to this structural feature, the cable member of the left and right handles can be supported and guided.

Where the holding portion is employed, the cable bracket preferably includes a bracket main body connected with the top bridge, a projecting piece protruding from the bracket main body and a grommet member engaged by the projecting piece and made of an elastic material, in which case the cable member is held by the grommet member at a location closer to a handle side than to the holding portion. According to this structural feature, since the cable members are bundled together by the grommet member, fixture of the cable members can be facilitated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
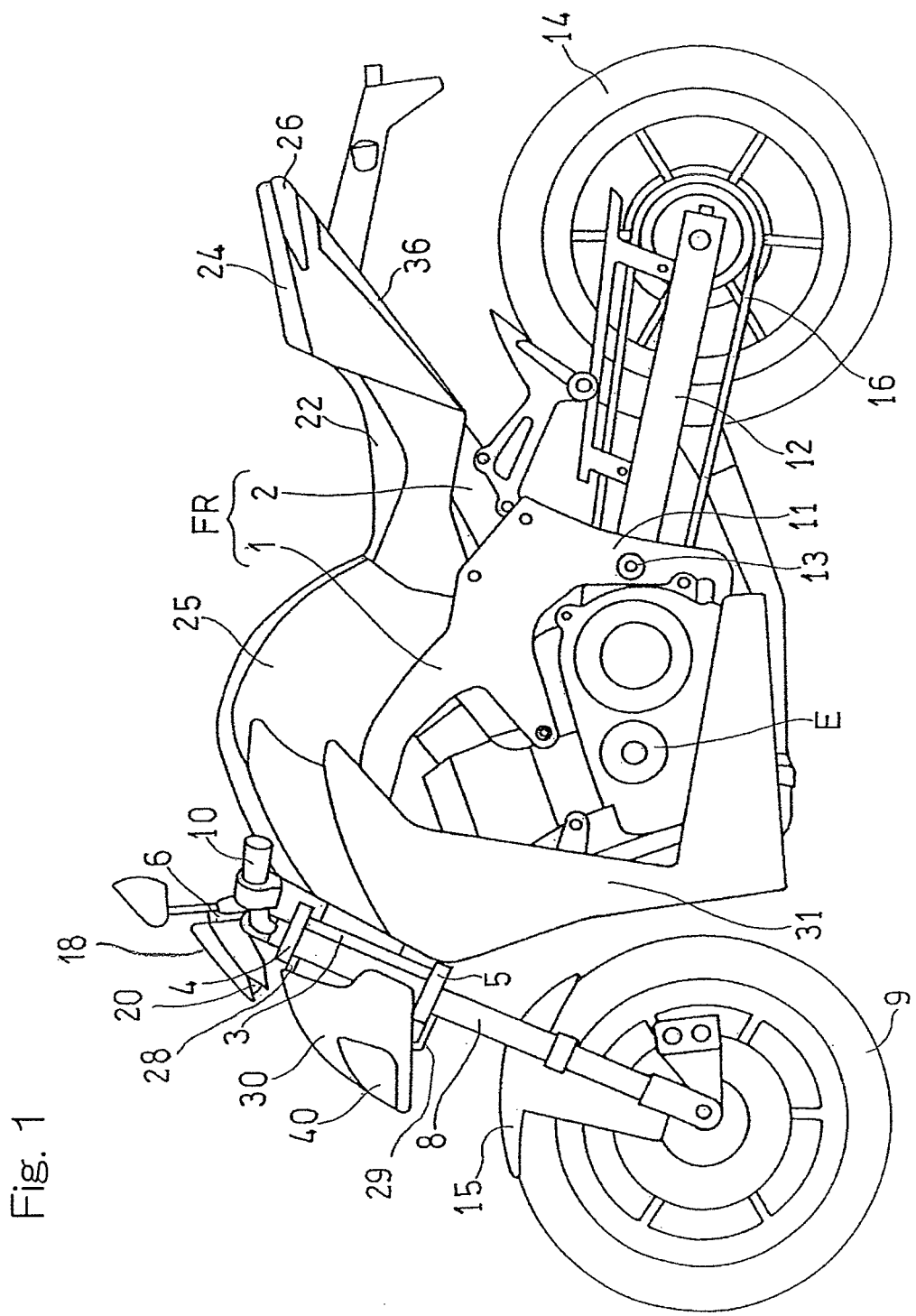
FIG. 1 is a schematic side view of a motorcycle equipped with a hardness support structure designed in accordance with a preferred embodiment of the present invention.

Hereinafter, a preferred embodiment of the present invention will be described in detail with reference to the accompanying drawings. In describing the present invention, however, the terms "left and right" used hereinafter are to be understood as relative terms description of positions and/or direction as viewed from a motorcycle rider occupying the seat during the forward travel of the motorcycle.

A motorcycle referred to in this specification has a vehicle frame structure FR made up of a main frame 1, forming a front half portion thereof, and a rear frame 2 rigidly secured to a rear portion of the main frame 1 and forming a rear half portion thereof. A head pipe 3 is fitted to a front portion of the main frame 1, top and bottom bridges 4 and 5, which are spaced a distance from each other, are fitted to a steering shaft (not shown) that is rotatably inserted in the head pipe 3. A front fork 8 is supported by the top and bottom bridges 4 and 5.

The front fork 8 has a lower end portion on which a front wheel 9 is supported, and a front fender 15 is fitted above the front wheel 9. A handle 10 and a gauge unit or meter unit 6 are fitted to the top bridge 4 at an upper end portion of the front fork 8. A meter visor 18 is disposed forwardly of the gauge unit 6 and a position lamp 20 is disposed on a tip end portion or a front end portion of the gauge visor 18.

The main frame 1 has a rear end portion provided with a swingarm bracket 11, and a swingarm 12 is supported by the swingarm bracket 11 for swinging movement about a pivot pin 13 that is inserted in a front end portion of the swingarm 12. This swingarm 12 has a rear end portion on which a rear wheel 14 is supported. A combustion engine E is supported at a lower and intermediate portion of the main frame 1 and is used to drive the rear wheel 14 through a power transmitting mechanism 16 such as, for example, a substantially endless chain.

A rider's seat 22 and a fellow passenger's seat 24 are supported by the rear frame 2, and a tail lamp 26 is supported by a rear end of the rear frame 2. A rear fender 36 positioned above the rear wheel 14 is fitted below the tail lamp 26.

A fuel tank 25 is fitted to an upper portion of the main frame 1, that is, to a vehicle body upper portion and between the handle 10 and the rider's seat 22. Also, a headlamp device 40, which forms an instrument disposed forwardly of the vehicle body, is supported by the top bridge 4 and the bottom bridge 5. A front fairing 30 made of a resinous material is supported by the headlamp device 40 and covers the headlamp device 40 from above, below and lateral sides.

The headlamp device 40 employed in the practice of this embodiment now under discussion is of a type utilizing a light emitting diode as a light source, and is fitted to the top bridge 4 and the bottom bridge 5 through an upper lamp bracket 28 and a lower lamp bracket 29, respectively. The details of the upper lamp bracket 28 will be described later. A side fairing 31, made of a resinous material, is mounted rearwardly of the front fairing 30 so as to cover from lateral side a region ranging from a lower portion of the fuel tank 25 to front and lower portions of the combustion engine E.

Figure 2:
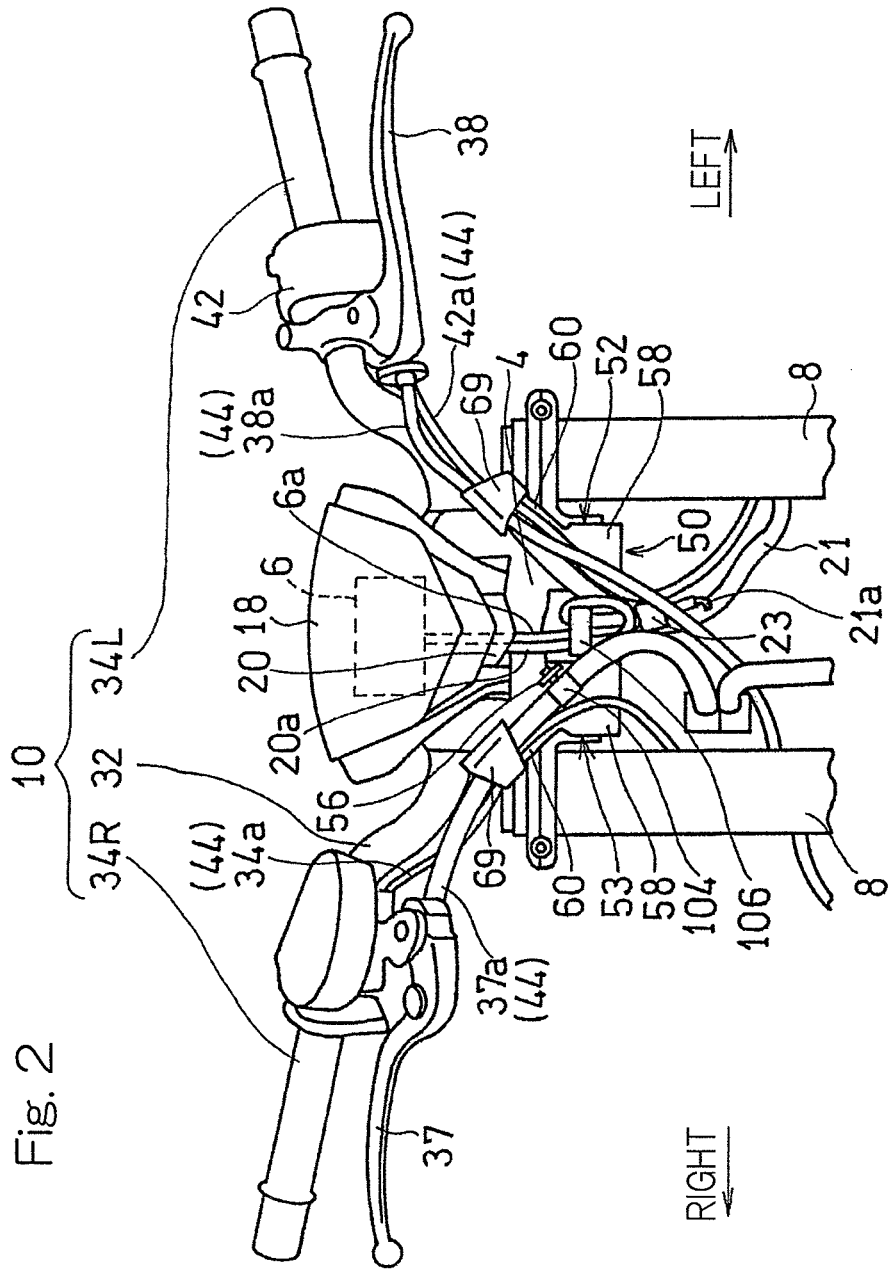
FIG. 2 is a schematic front elevational view showing an important portion of the motorcycle.

As shown in FIG. 2, the handle 10 includes a single handlebar 32, which is of such a shape having its opposite end portions bent to rise to a position higher than an intermediate portion thereof between those opposite end portions, and left and right side grips 34L and 34R mounted on left and right side end portions thereof. The right side grip 34R is a mechanical or electrical accelerator grip, and from this accelerator grip 34R an accelerator grip cable 34a extends downwardly and rearwardly. Also, a brake lever 37 for a hydraulic brake system is fitted to a right side of the handlebar 32, and from this brake lever 37 a brake tube 37a for the flow of oil extends downwardly and rearwardly.

To a left side of the handlebar 32, a clutch lever 38 for a hydraulic clutch system and a grip switch 42 for an electric system are fitted. From the clutch lever 38 and the grip switch 42, a clutch tube 38a for the flow of oil and a grip switch cable 42a having electric wiring sheathed extend downwardly and rearwardly, respectively. The grip switch 42 is, for example, a switch for turn indicator lamps. In the specification herein provided, the accelerator grip cable 34a, the brake tube 37a, the clutch tube 38a or the grip switch cable 42a is collectively referred to as "cable member 44".

A gauge harness 6a for the gauge unit 6 and a position lamp cable 20a for the position lamp 20 also extend downwardly and rearwardly. Specifically, the gauge harness 6a is directly in continuation with a main harness 21, and the position lamp cable 20a is connected with the main harness 21 from a bifurcated portion 21a through a coupler 23. The main harness 21 extends in a longitudinal direction of the vehicle body. A cable bracket 50 for fixing the gauge harness 6a, the position lamp cable 20a and a plurality of the cable members 44 is supported by the top bridge 4.

Figure 3:
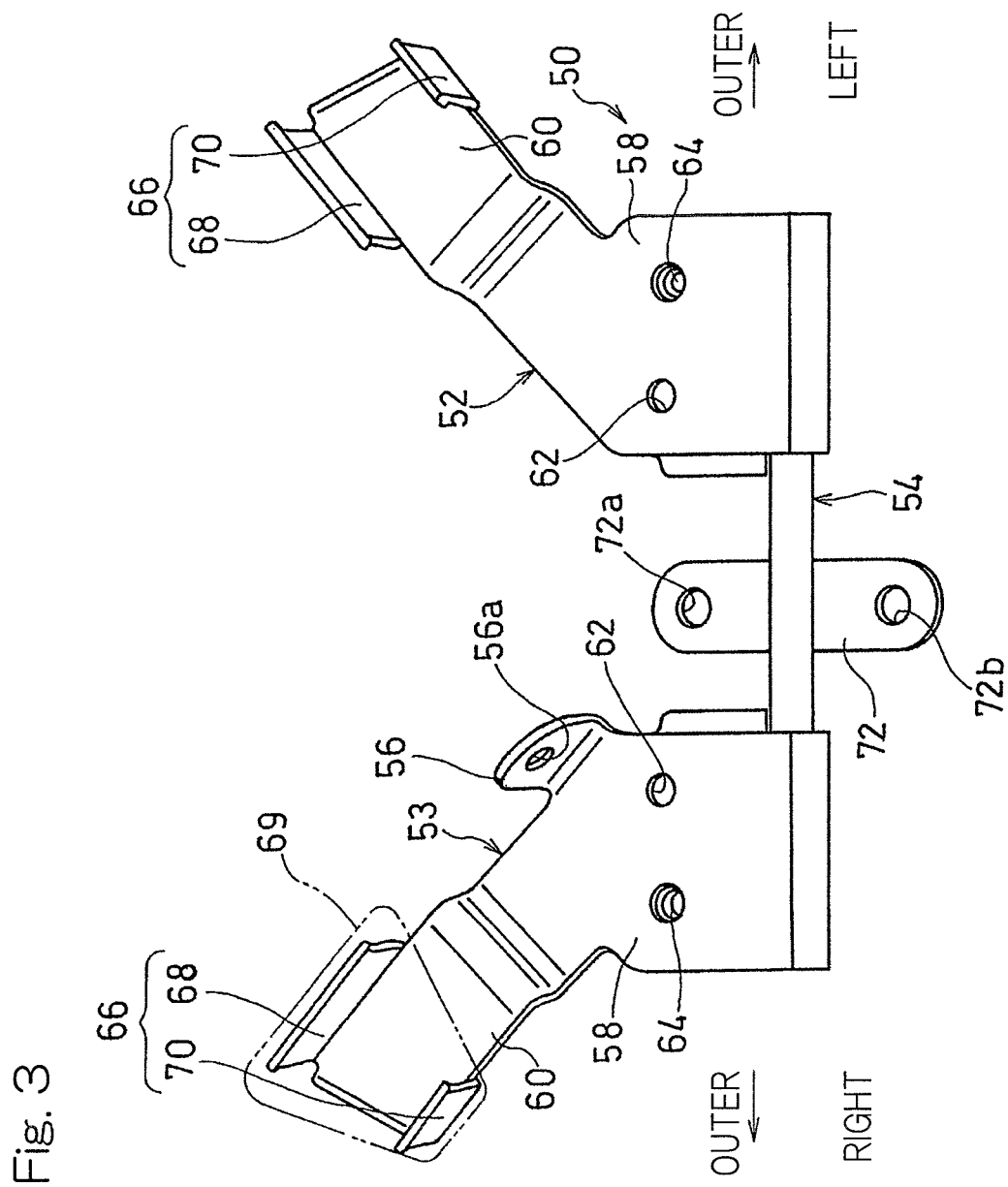
FIG. 3 is a schematic front elevational view showing, on an enlarged scale, a cable bracket employed in the motorcycle.

As shown in FIG. 3, the cable bracket 50 includes left and right side bracket main bodies 52 and 53 and a connecting member 54 for connecting the left and right side bracket main bodies 52 and 53. Those members 52 to 54 are connected with each other by means of, for example, welding. In the illustrated embodiment now under discussion, the bracket main bodies 52 and 53 are formed by bending a metal sheet member, and the connecting member 54 is in the form of a metallic rod member.

The left side bracket main body 52 and the right side bracket main body 53 are identical in structure and shape with each other, except that the right side bracket main body 53 includes an extra first holding portion 56 for holding an intermediate portion of the respective cable members 44. Accordingly, regarding the structure and shape of each of the left and right side bracket main bodies 52 and 53, only the right side bracket main body 53 will be described for the sake of brevity. It is to be noted that the first holding portion 56 may be provided in both of the left and right side bracket main bodies 52 and 53 or only in the left side bracket main body 52. If the first holding portion 56 is provided in both of the left and right side bracket main bodies 52 and 53, the cable members 44 extending from the left and right side handles can be stably supported and guided.

The right side bracket main body 53 includes a support segment 58 and a guide segment 60 extending from the support segment 58 in a direction diagonally outwardly and upwardly. The first holding portion 56 referred to above is provided in an inner side area of an upper edge of the support segment 58. It is to be noted that the terms "inner side" and "outer side" hereinafter used in this specification are to be understood as relative terms as viewed with respect to a vehicle widthwise direction. The first holding portion 56 is formed by bending a metallic piece an angle of about 90° in a forward direction, and is formed with a throughhole 56a.

A lower end portion of the support segment 58 is so bent in a rearward direction as to accommodate the connecting member 54, and the connecting member 54 is welded to that bent portion. A bolt insertion hole 62 oriented in a forward and rearward direction or longitudinal direction of the vehicle body is formed in the support segment 58, whereas an instrument mounting hole 64 in the form of a threaded hole that is oriented in the longitudinal direction is formed on an outer side of the bolt insertion hole 62. In the embodiment now under discussion, the instrument mounting hole 64 is constituted by a weld nut (not shown) secured to a rear surface of the support segment 58.

The guide segment 60 has an outer side end portion provided with a projecting piece 66 protruding from the guide segment 60 in a forward direction. This projecting piece 66 includes a first projecting piece 68, bent from an upper edge of the guide segment 60 in a front side, and a second projecting piece 70, bent from a lower edge towards the front side. The first projecting piece 68 is so formed as to have a substantial length in a direction conforming to the direction of extension of the guide segment 60. A grommet member 69 made of an elastic material such as, for example, rubber, is engaged to the projecting piece 66.

Figure 6:
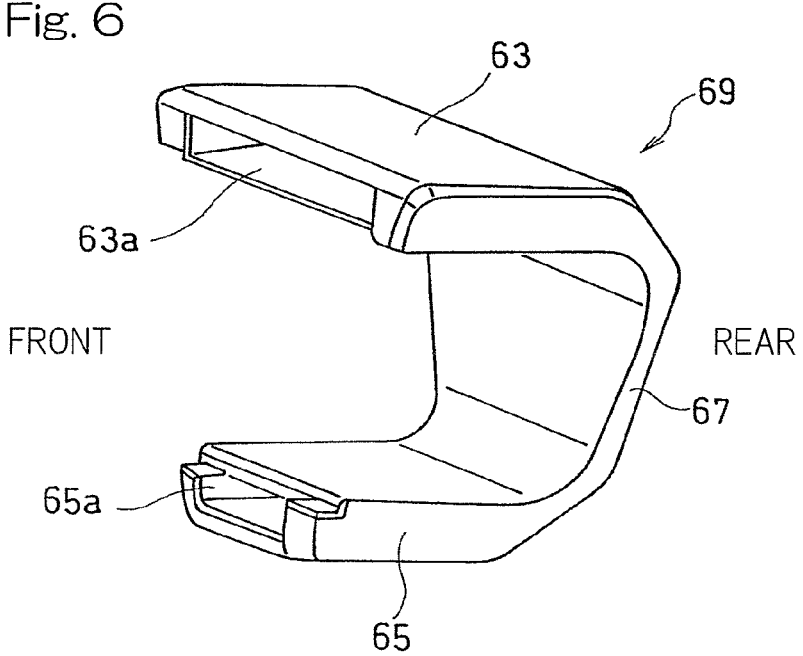
FIG. 6 is a perspective view showing a grommet member used on the cable bracket.

As shown in FIG. 6, the grommet member 69 includes an upper wall 63, a lower wall 65 and a connecting wall 67 connecting the upper and lower walls 63 and 65 together. All of those walls 63, 65 and 67 are so integrated together as to render the grommet member 60 to represent a substantially or generally U-shaped configuration opening forwards. Respective front end faces of the upper and lower walls 63 and 65 are formed with to-be-engaged grooves 63a and 65a concaved rearwardly, and those to-be-engaged grooves 63a and 65a are engaged respectively in the first and second projecting pieces 68 and 70 shown in FIG. 3.

A leftward and rightward direction or vehicle widthwise direction intermediate portion of the connecting member 54 has a second holding portion 72 secured thereto by means of welding. The second holding portion 72 is in the form of a plate member extending in a vertical direction. This second holding portion 72 is used to hold the gauge harness 6a and the position lamp cable 20a, both shown in FIG. 2. As shown in FIG. 3, upper and lower portions of the second holding portion 72 are formed with respective throughholes 72a and 72b, which are oriented in the longitudinal direction, while an intermediate portion secured to the connecting member 54 intervenes therebetween.

Figure 4:
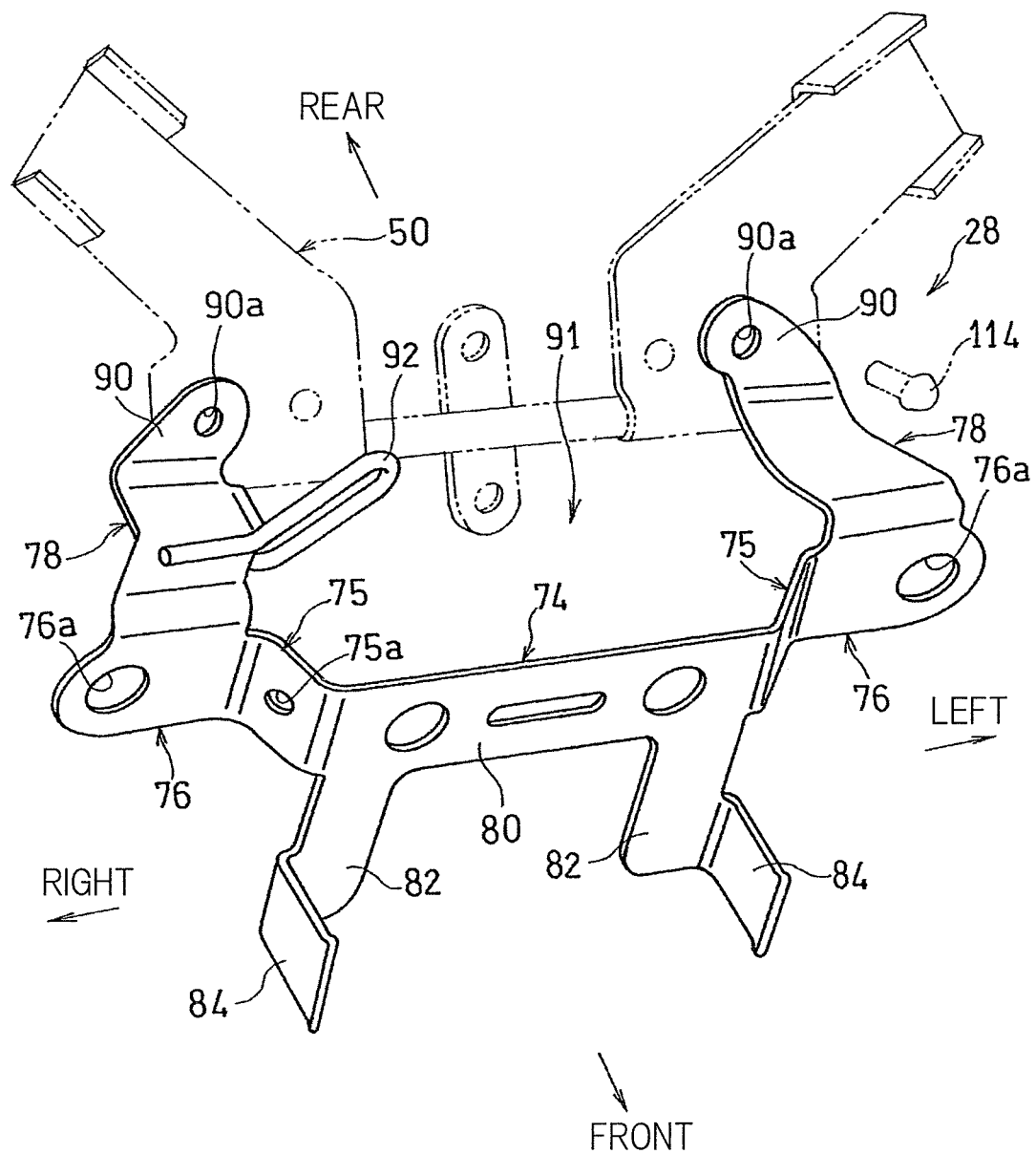
FIG. 4 is a perspective view of an upper lamp bracket employed in the motorcycle.

FIG. 4 illustrates a perspective view showing an upper lamp bracket 28 as viewed from diagonally upwardly and forwardly, which bracket 28 is an instrument bracket for supporting the head lamp device 40. The upper lamp bracket 28 is formed by bending a metal plate, and includes a box engaging portion 74 in the leftward and rightward direction intermediate portion, inclined portions 75, 75 inclined from left and right opposite end portions of the box engaging portion 74 in a diagonally rearwardly and in leftward and rightward directions, respectively, lamp support portions 76 and 76 extending from each of the inclined portions 75 and 75 in the left or right direction, and a bridge mounting portion 78 extending rearwardly from each of the lamp support portions. Each of the inclined portions 75 and 75 is formed with a throughhole 75a, and each of the lamp support portions 76 and 76 is formed with a lamp mounting hole 76a that is oriented in the longitudinal direction.

The box engaging portion 74 is of a generally gate-like shape, and includes an upper half portion of a rectangular shape, which is elongated in the vehicle widthwise direction and forming an upper portion, a pair of lower half portions 82 and 82 which extend downwardly respectively from opposite end portions of the upper half portion 80. Respective lower end portions of the lower half portions 82 and 82 of the box engaging portion 74 are respectively formed with engagement pieces 84 and 84 each extending in a forward direction.

Figure 5:
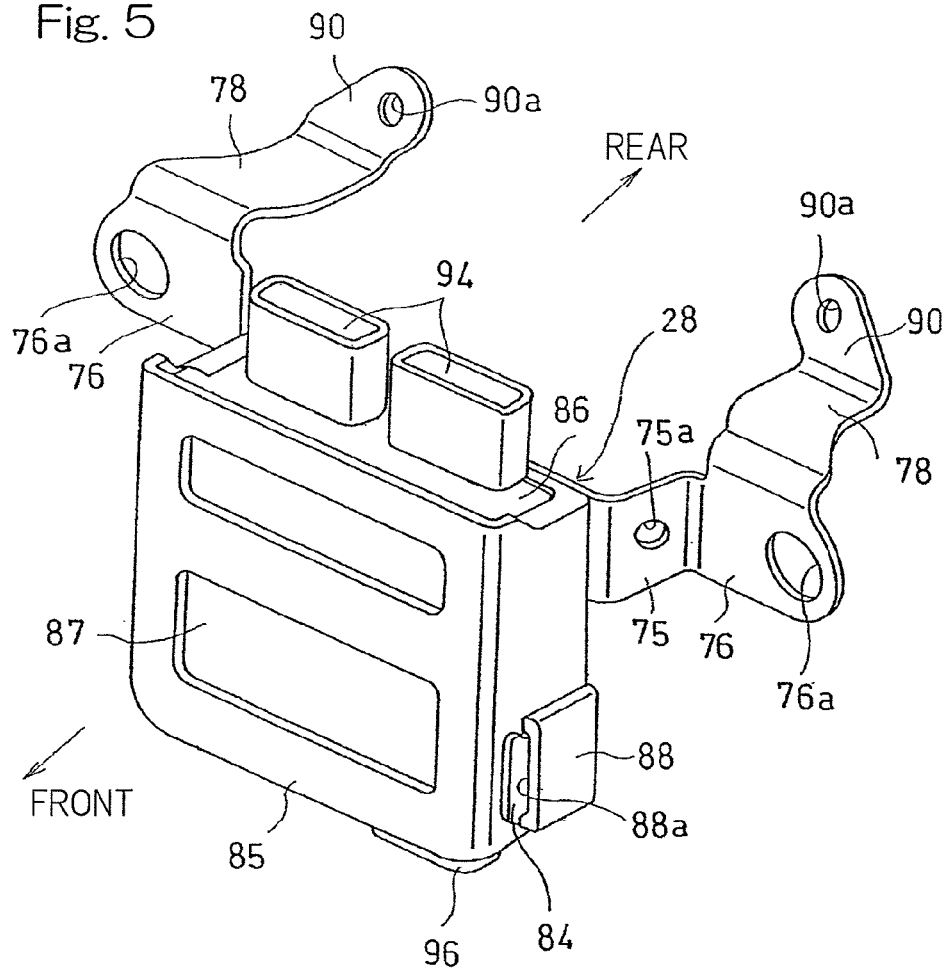
FIG. 5 is a perspective view showing mounting of an electric power source unit for a headlamp device on the upper lamp bracket.

As shown in FIG. 5, the headlamp device 40 shown in FIG. 1 includes an electric power source circuit unit 86 which is engaged to the box engaging portion 74 of the upper portion lamp bracket 28 through a cubic shaped box 85 made of an elastic material such as, for example, rubber. Specifically, when the electric power source circuit unit 86 is inserted from above into the box 85 and the left and right side engagement pieces 84 and 84 of the upper lamp bracket 28 are engaged in engagement grooves 88a and 88a in left and right side bracket engagement portions 88 and 88 defined in the box 85, the electric power source circuit unit 86 is engaged through the box 85.

The electric power source circuit unit 86 is operable to control a direct current power from an electric power source (a battery not shown) and then to supply it to the light emitting diode of the headlamp device 40 (shown in FIG. 1), which diode forms a light source. This electric power source circuit unit 86 includes a unit main body 87 of a rectangular shape, when viewed from front. The unit main body 87 has an upper portion provided with two output side connectors 94 oriented upwardly and also has a lower portion provided with an input side connector 96 oriented downwardly. The input side connector 96 is connected with an input cable 95 (best shown in FIG. 8) for connecting the electric power source circuit unit 86 with an electric power source on the side of the vehicle body, whereas the output side connectors 96 are connected with output cables for connecting the electric power circuit unit 86 with the headlamp device 40 (best shown in FIG. 1).

Each of the bridge mounting portions 78 and 78 has a respective inclined wall 90, which is inclined diagonally upwardly and rearwardly, at a rear end thereof. Each of the inclined walls 90, 90 is formed with a bolt insertion hole 90a. The right side bridge mounting portion 78 is provided with a third holding portion 92 for holding the cable members 44 (shown in FIG. 2) in cooperation with the first holding portion 56 in the cable bracket 50. By the upper lamp bracket 28 and the cable bracket 50, an opening 91 that opens in the vertical direction is formed.

The third holding portion 92 referred to above is formed by bending a wire, and is secured to the bridge mounting portion 78 by means of welding. In the embodiment now under discussion, the third holding portion 92 is provided only in the right side bridge mounting portion 78, but the third holding portion 92 may be provided only in the left side bridge mounting portion 78 or may alternatively be provided in both of the left and right side bridge mounting portions 78 and 78, or the third holding portion 92 may not be necessary. If the third holding portion 92 is provided in a pair on the left side and the right side, the cable members 44 from the left and right side handles can be stably supported and guided. It is to be noted that in FIG. 5, the third holding portion 92 is not shown for the sake of brevity.

Figure 8:
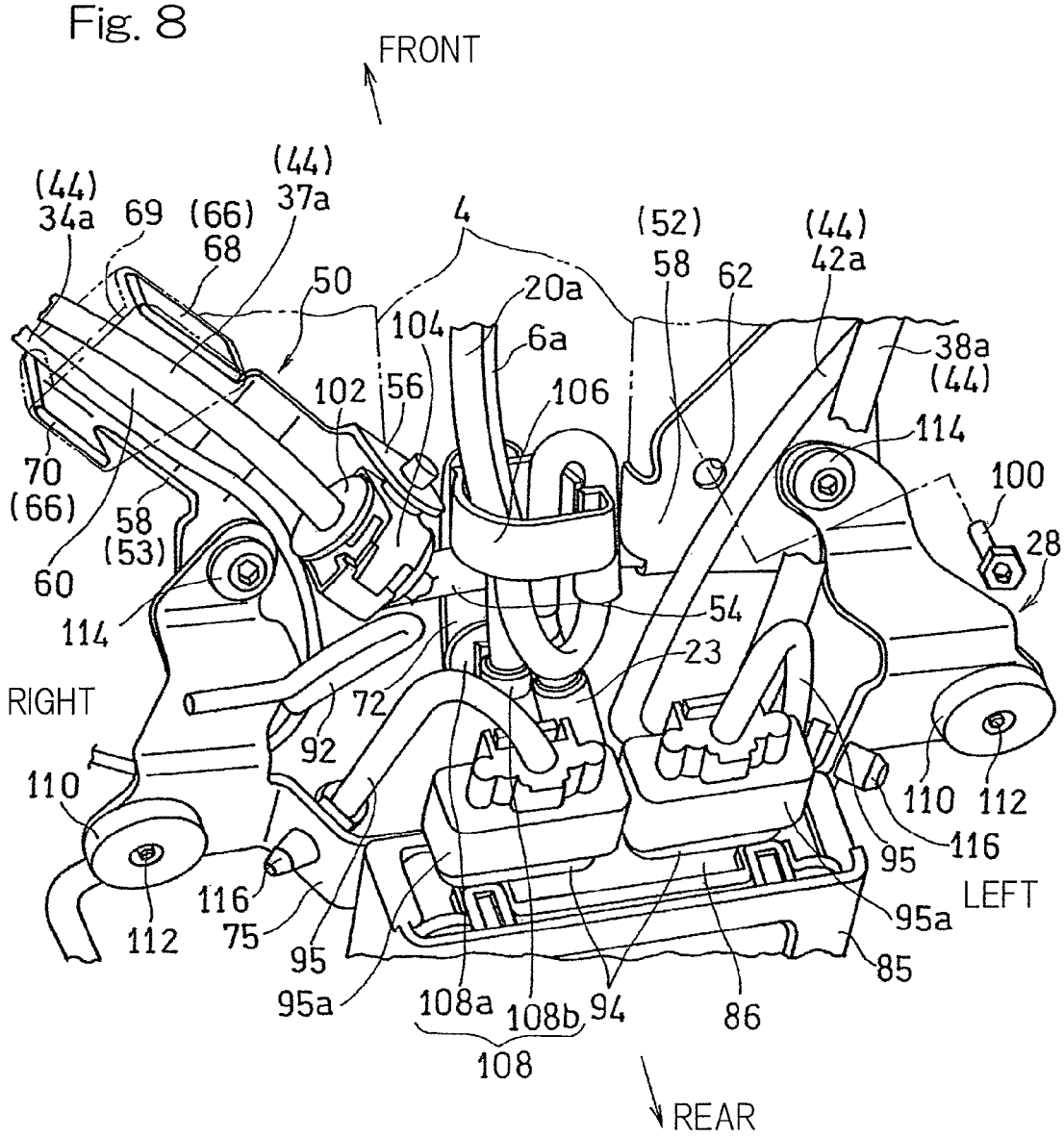
FIG. 8 is a perspective view showing a front portion of the motorcycle as viewed diagonally upwardly and forwardly.

Mounting of the cable bracket 50 and the upper lamp bracket 28 on the vehicle body and support of the cable members 44 will now be described. At the outlet, the cable bracket 50 shown in FIG. 2 is fitted to the top bridge 4. Specifically, as shown in FIG. 8, by inserting a bolt 100 from front into the bolt insertion hole 62 in the support portion 58 of the cable bracket 50 and then threading the bolt 100 into a screw hole (not shown) defined in the top bridge 4, the cable bracket 50 is fitted to the top bridge 4. Although FIG. 8 shows only the bolt insertion hole 62 in the left side bracket main body 52, the right side bracket main body 53 is similarly connected with the top bridge 4 with a bolt.

Subsequently, the gauge harness 6a, the position lamp cable 20a and the cable members 44, all shown in FIG. 2, are supported to the cable bracket 50. At the outset, the accelerator grip cable 34a and the brake tube 37a, both extending from the right side handle 10, are held by the guide portion 60 of the right side bracket main body 53 by means of the grommet member 69, and the clutch tube 38a and the grip switch cable 42a, both extending from the left side handle 10, are held by the guide portion 60 of the left side bracket main body 52.

As shown in FIG. 8, the cable members 44 are bundled together in a manner having been restrained by the first and second projecting pieces 68 and 70 from its movement in the vertical direction and also having been restrained by the grommet member 69 from its movement in a forward direction, and extend diagonally downwards towards an inner side of the guide portion 60.

The brake tube 37a, which is one of the cable members 44 extending along the guide portion 60 of the right side bracket main body 53, is fixed by the first holding portion 56. Specifically, with the brake tube 37a inserted in an inner side of a tubular collared elastic body 102 such as, for example, a grommet and with the elastic body 102 held by a first clamp member 104 fitted to the throughhole 56a (shown in FIG. 5) in the first holding portion 56, the brake tube 37a is fixed by the first holding portion 56.

Thereafter, the position lamp cable 20a and the gauge harness 6a disposed at the vehicle body widthwise direction intermediate portion, shown in FIG. 2, are fixed to the cable bracket 50. Specifically, as shown in FIG. 8, after the gauge harness 6a has been held by a second clamp member 106 fitted to the upper side through-hole 72a (FIG. 3) of the second holding portion 72, the gauge harness 6a is fixed by a fixing member 108 such as, for example, a binding band fitted to the lower through-hole 72b (FIG. 3) of the second holding portion 72. The fixing member 108 employed in the practice of the embodiment now under discussion is of a type having fitting portion 108a, which is fitted to the throughhole 72a (shown in FIG. 3) and a fixing band portion 108 for fixing the instrument harness 6a.

The position lamp cable 20a referred to previously is, after having passed the second cramp member 106, bent upwardly to again pass the second cramp member 106, and is then held by the second clamp member 106 together with the instrument harness 6a. The position lamp cable 20a is, after having held double by the second cramp member 106, connected with the coupler 23 below the second clamp member 106, and is then connected with the main harness 21 best shown in FIG. 2. In this way, the cable bracket 50 also supports cables other than the cable members 44 having one end portion connected with the handle 10.

The clutch tube 38a and the grip switch cable 42a, which form respective parts of the cable members 44 extending along the guide portion 60 of the left bracket main body 52, are not held by the cable bracket 50 other than being held by the grommet member 69.

Following that, the headlamp device 40 (best shown in FIG. 1) is fitted to the cable bracket 50 through the upper lamp bracket 28. Prior to that, a subassembly including the front fairing 30 and the head lamp device 40, both best shown in FIG. 1, should have been assembled together. Specifically, the front faring 30 should have been fitted to the headlamp device 40 by means of bolts, followed by fitting of the headlamp device 40 to the upper lamp bracket 28.

Fitting of the headlamp device 40 to the upper lamp bracket 28 is accomplished by passing a tubular collared grommet 110, in the form of an elastic member such as rubber, into the lamp mounting hole 76a in the upper lamp bracket 28, then passing a bolt 112 from rear into an interior of the collared grommet 110, and finally fastening the bolt 112 into a threaded hole (not shown) in the headlamp device 40.

Subsequently, the subassembly referred to above is fitted to the top bridge 4 through the cable bracket 50. Fitting of the subassembly to the cable bracket 50 is accomplished by fitting the upper lamp bracket 28 to the cable bracket 50. Specifically, a bolt 114 is inserted from front into the bolt insertion hole 90a in the upper lamp bracket 28 and threading the bolt 114 into the instrument mounting hole 64 in the cable bracket 50. By so doing, the subassembly is fitted to the top bridge 4 through the cable bracket 50. It is to be noted that as described hereinabove, a lower portion of the headlamp device 40 shown in FIG. 1 is fitted to the bottom bridge 5 through the lower lamp bracket 29.

Thereafter, the cable members 44 and the input cable 95 are supported by the upper lamp bracket 28 shown in FIG. 8. Specifically, the accelerator grip cable 34a, which is a part of the cable members 44 extending along the guide portion 60 of the right side bracket main body 53, is held by the third holding portion 92 of the upper lamp bracket 28. Also, the input cable 95 towards the electric power source circuit unit 86 is connected with the input side connector 94 of the electric power source circuit unit 86 through the connector 95a. The input cable 95 is fixed by a fixing member 116 such as, for example, a binding band fitted to the throughhole 75a of the inclined portion 75 of the upper lamp bracket 28. In this way, by the upper lamp bracket 28, the input cable 95 is held.

Figure 7:
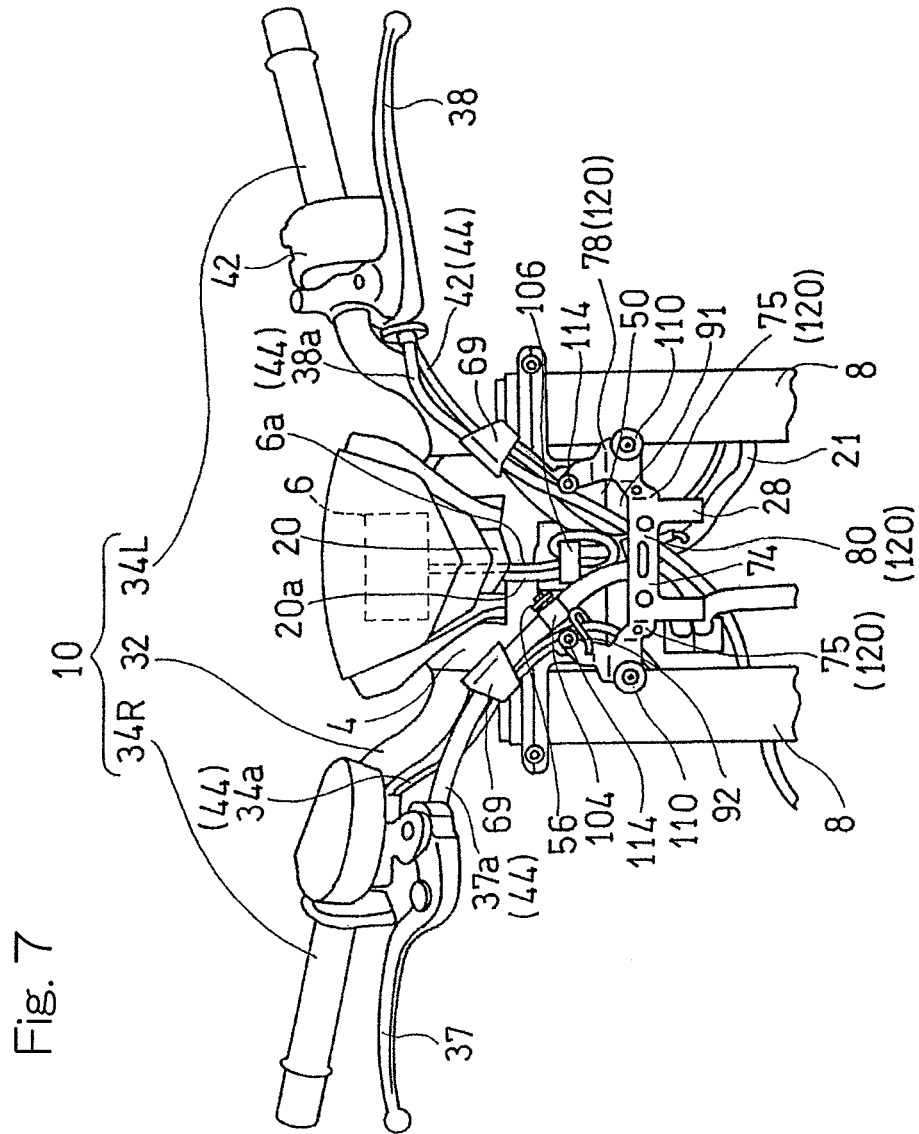
FIG. 7 is a view similar to FIG. 2, showing the upper lamp bracket added to FIG. 2.

FIG. 7 illustrates a condition in which with the front fairing 30 and the headlamp device 40 removed away, only the upper lamp bracket 28 is fitted to the cable bracket 50. As shown in FIG. 7, the gauge harness 6a, the position lamp cable 20 and the cable members 44 are guided in the opening 91 open in the vertical direction, which is defined by the upper lamp bracket 28 and the cable bracket 50.

The cable members 44, when passing the opening 91, contact the upper lamp bracket 28 and is therefore refrained from moving forwards. In other words, the upper lamp bracket 28 forms a regulating portion 120 that inhibits the forward movement of the cable member 44 at a position distant from the handle 10 rather than from the first holding portion 56. Specifically, the upper half portion 80 of the box engaging portion 74, the inclined portion 75 and the bridge mounting portion 78 in the upper lamp bracket 28 altogether form the regulating portion 120. In the embodiment now under discussion, the upper lamp bracket 28 itself is rendered to be the regulating member 120, but a regulating member 20 may be separately provided in the upper lamp bracket 28 or the cable bracket 50.

In the construction hereinabove described, after the cable bracket 50 shown in FIG. 7 has been fitted to the top bridge 4 and the cable members 44 have subsequently been fixed to the cable bracket 50, the upper lamp bracket 28, with which the headlamp device 40 (best shown in FIG. 1) is connected, can be fitted to the cable bracket 50. Accordingly, support of the cable members 44 to the top bridge 4 and fitting of the head lamp device 40 is easy and the assemblability is increased consequently.

The first holding portion 56 is formed in the cable bracket 50 and the upper lamp bracket 28 functions as the regulating portion 120 for inhibiting the forward movement of the cable member 44. Accordingly, the cable members 44 can be fixed by the first holding portion 56, and also, the forward movement of the cable members 44 are also suppressed by the regulating portion 120. Hence, the cable members 44 can be compactly supported and guided. In addition, since the upper lamp bracket 28 itself forms the regulating portion 120, the cable members 44 can be effectively regulated with no separate regulating portion employed.

As shown in FIG. 8, at a position closer to the handle 10 than to the first holding portion 56, the cable members 44 are held by the projecting piece 66 and the grommet member 69. Therefore, fixture of the cable members 44 by means of the first holding portion 56 and the second holding portion 92 is rendered to be easy.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Although in describing the foregoing embodiment of the present invention, reference has been made to the headlamp device 40 as an instrument disposed forwardly of the vehicle body, the present invention is equally applicable to any instrument, such as, for example, a relay box, an electric power source circuit, a GPS antenna unit, an ETC unit and/or an immobilizer amplifier, other than the head lamp device 40.

Accordingly, such changes and modifications are, unless they depart from the scope of the present invention as delivered from the claims annexed hereto, to be construed as included therein.

REFERENCE NUMERALS

4 . . . Top bridge
10 . . . Handle
28 . . . Upper lamp bracket (Instrument bracket)
40 . . . Headlamp device (Instrument)
44 . . . Cable member
50 . . . Cable bracket
52, 53 . . . Bracket main body
56 . . . First holding portion (Holding portion)
66 . . . Projecting piece
69 . . . Grommet member
91 . . . Opening
120 . . . Regulating portion

What is claimed is:

1. A motorcycle comprising:
a handle;
a top bridge to which the handle is fitted;
cable members having one end connected to the handle;
a cable bracket configured to fix a portion of the cable members that are each connected at a different respective end of the handle and supported by the top bridge;
an instrument bracket configured to support an instrument disposed forwardly of a vehicle body and fitted to the cable bracket;
a pair of holding portions are configured to respectively hold an intermediate portion of the cable members fixed to the cable bracket;
a regulating portion provided in at least one of the cable bracket and the instrument bracket at a position further from the handle than from the holding portions and operable to inhibit a forward movement of the cable member in a front traveling direction of the motorcycle wherein the cable bracket includes a bracket main body connected with the top bridge;
a projecting piece protruding from the bracket main body and a grommet member engaged by the projecting piece and made of an elastic material; and
the cable member is held by the grommet member at a location closer to the handle than to the holding portion.

2. The motorcycle as claimed in claim 1, in which:
the cable member is passed through an opening formed by the cable bracket and the instrument bracket and oriented in a vertical direction; and
the instrument bracket forms the regulating portion.

3. The motorcycle as claimed in claim 1, in which one of the holding portions is provided on a left side and the other holding portion on the right side with respect to a vehicle widthwise center line,
the cable members from a right handle bar of the handle is held by the right side holding portion, and
the cable members from a left handle bar of the handle is held by the left side holding portion.

4. The motorcycle as claimed in claim 1, in which the instrument comprises a headlamp.

5. A motorcycle, wherein:
a top bridge is connected for movement with a handle for steering the motorcycle, the top bridge having a cable bracket with a guide segment extending upward towards the handle and forming projection pieces on the guide segment adjacent the handle for supporting one or more cables that are attached to the handle;
a grommet member is attached to the projection pieces for securing the one or more cables; and
the grommet member is made of an elastic member for fastening to the projection pieces.

6. The motorcycle of claim 5, wherein an instrument bracket is secured to the cable bracket and extends outward from the cable bracket with a pair of engagement projections for supporting a head lamp and an electric power source circuit unit mounted in an elastic material box.

* * * * *